United States Patent
Dannenmaier (10) Patent No.: US 7,014,765 B2
(45) Date of Patent: Mar. 21, 2006

(54) FILTER COMPRISING MEMBRANES MADE OF HOLLOW FIBERS

(75) Inventor: Jürgen Dannenmaier, Balingen (DE)

(73) Assignee: Gambro Dialysatoren GmbH & Co. KG, (DE)

( * ) Notice: Subject to any disclaimer, the term of this patent is extended or adjusted under 35 U.S.C. 154(b) by 161 days.

(21) Appl. No.: 10/169,456

(22) PCT Filed: Feb. 14, 2001

(86) PCT No.: PCT/IB01/00184

§ 371 (c)(1),
(2), (4) Date: Jul. 2, 2002

(87) PCT Pub. No.: WO01/60502

PCT Pub. Date: Aug. 23, 2001

(65) Prior Publication Data

US 2003/0029785 A1    Feb. 13, 2003

(30) Foreign Application Priority Data

Feb. 17, 2000 (SE) .................................. 0000505

(51) Int. Cl.
*B01D 63/00* (2006.01)

(52) U.S. Cl. .............. 210/321.8; 210/321.78; 210/321.79; 210/321.9; 210/321.87; 210/500.23; 96/8; 96/10

(58) Field of Classification Search .......... 210/321.78, 210/321.79, 321.8, 321.9, 321.87, 321.88, 210/321.89, 321.81, 500.23; 96/8, 10
See application file for complete search history.

(56) References Cited

U.S. PATENT DOCUMENTS

| | | | |
|---|---|---|---|
| 4,157,114 A | | 6/1979 | De Lorenzo |
| 4,283,284 A | * | 8/1981 | Schnell .................... 210/321.8 |
| 4,334,993 A | * | 6/1982 | Norton ..................... 210/321.8 |
| 4,414,110 A | * | 11/1983 | Geel et al. ............... 210/321.8 |
| 4,990,251 A | * | 2/1991 | Spranger et al. ......... 210/321.8 |
| 5,053,130 A | * | 10/1991 | Raff et al. ............. 210/321.79 |
| 5,236,586 A | * | 8/1993 | Antoni et al. ............ 210/321.8 |
| 5,472,601 A | * | 12/1995 | Eguchi ..................... 210/321.8 |

FOREIGN PATENT DOCUMENTS

| | | |
|---|---|---|
| EP | 0 305 687 B1 | 3/1989 |
| EP | 0 355 325 A1 | 2/1990 |
| EP | 0 525 317 B1 | 2/1997 |

OTHER PUBLICATIONS

Patent Abstract of Japan vol. 1998, No. 11, Sep. 30, 1998 & JP 10 165777 A (Toray Ind Inc), Jun. 23, 1998 abstract.

* cited by examiner

*Primary Examiner*—Ana Fortuna
(74) *Attorney, Agent, or Firm*—Lerner, David, Littenberg, Krumholz & Mentlik, LLP (57) ABSTRACT

The invention relates to a filter comprising membranes made of hollow fibers in which the hollow fibers are arranged as a bundle in a tubular housing. The housing comprises an end cap on each of its ends, whereby the hollow fiber bundle is placed between the ends of the housing. The ends of the hollow fiber bundle each comprise a support ring that surrounds the same and are cast inside said support ring. The support rings are displaceably mounted in the housing in order to compensate for, among other things, axial contractions of the hollow fiber bundle occurring during heat sterilization.

15 Claims, 8 Drawing Sheets

FILTER COMPRISING MEMBRANES MADE OF HOLLOW FIBERS

The present invention relates to a filter comprising membranes made from hollow fibers, in which the hollow fibers are provided as a bundle arranged in a tubular housing. The housing is provided at each end with an end-cap, wherein the hollow fiber bundle is arranged between the ends of the housing, a support-ring for each end of the hollow fiber bundle is arranged around each respective end of the hollow fiber bundle, which ends are cast within a potting compound, and the ends of the hollow fibers are open.

TECHNICAL BACKGROUND

Filters having hollow fiber membranes are used i.e. in the area of dialysis for a wide variety of purposes. Such filters are used, for example, in haemodialysis, in which blood is directed into and through the inside of the semi-permeable walls of the hollow fibers while dialysis fluid is directed around the outside of the hollow fibers. Various convection and diffusion processes thereby take place through the walls of the hollow fibers, which processes serve to purify the blood and to remove excess fluid. Additionally, due to this, the electrolyte concentration in the blood can be conditioned, and buffers such as bicarbonate or acetate can be added to the blood.

Filters of this type are also employed in so-called haemofiltration, in which a substitution fluid is added to the blood. According to this process, the blood is directed through the inside of the hollow fibers, although in this case no dialysis fluid is passed around the outside of the fibers. Here, in the filter, excess fluids, in particular water as well as waste products, are removed from the blood only by means of a pressure difference across the membrane, i.e. the semi-permeable walls of the hollow fibers. The substitution fluid can be added either before or after the filter.

The above-mentioned filters can equally be used as so-called ultrafilters for the production of the substitution fluid. In this case, dialysis fluid can for example be directed through the inside of the hollow fibers and can, by means of a pressure difference, be filtered through the membrane or semi-permeable walls, whereby the dialysis fluid can be sterile-filtered as a result of the removal of endotoxins, bacteria and other contaminants.

Further uses for the filters mentioned include haemodiafiltration; a combination of haemodialysis and haemofiltration, as well as plasmapheresis, in which the aqueous blood-plasma is filtered out of the blood and returned to the blood again after treatment. Such filters are also used in reverse osmosis.

The aforementioned filters are usually so constructed that the hollow fibers are arranged as a loose bundle collected together within a tubular housing. The housing is provided at each end with an end-cap, whereby the hollow fiber bundle is arranged between the ends of the housing so that the end-caps cover the ends of the hollow fiber bundle. A support ring is provided around each end of the hollow fiber bundle, while the ends of the hollow fibers are embedded within a potting compound at the ends of the housing.

The hollow fibers collected together in the hollow fiber bundle have ends which open into a hollow space located between the end cap and the end of the hollow fiber bundle. It is therefore possible, with the appropriate arrangement of inlets and outlets, to provide, in a known manner, various forms of filter, such as the previously mentioned haemodialysis filters, haemofilters, haemodiafilters, ultrafilters etc.

Examples of the previously mentioned filters are disclosed in EP-0 305 687, EP-0 355 325 and EP-0 525 317.

Essentially, all the previously mentioned filters have certain features in common, namely that a first fluid is directed into and through the inside of the semi-permeable hollow fibers while a second fluid is present on the outside of the hollow fibers. This second fluid can either flow through the housing, past and around the hollow fibers, via appropriately located inlet and outlet means; or it can for example be removed from the first fluid and directed out of the housing via a suitable outlet, for example by means of a pressure differential across the hollow fiber membrane.

A disadvantage of the previously mentioned filters can be seen in that during the usual heat-sterilization process, for example using steam, shrinkage of the hollow fibers occurs, in particular with synthetic hollow fibers. These mainly axial shrinkages of the hollow fibers can lead to damage or in worse cases to leakage, especially when the extent of the shrinkage cannot be compensated for by the elasticity of the hollow fibers.

It is clear, especially during the above-mentioned uses of these filters, that any leakage of the hollow fiber membrane should be avoided in all circumstances. A leakage in just a single fiber could lead to a serious risk for a patient.

DESCRIPTION OF THE INVENTION

Against this background, the problem which the present invention seeks to solve is that of providing a filter having hollow fiber membranes in which the hollow fibers are arranged as a bundle within a tubular housing and in which the housing is provided with an end-cap at each end thereof, wherein the hollow fiber bundle is arranged between the ends of the housing, and wherein a support ring is arranged around each end of the hollow fiber bundle, the ends of the hollow fibers being embedded within a potting compound and wherein the ends of the hollow fibers are open, and furthermore, wherein the hollow fibers are not susceptible to damage resulting from axial shrinkage.

This problem is solved by a filter of the aforementioned type, wherein the end of the hollow fiber bundle is embedded substantially only within the support ring by means of the potting compound.

A filter is thereby provided, which is substantially invulnerable to a heat or steam sterilization process. The term invulnerable as used herein is to be understood as meaning that the unavoidable shrinkage which occurs, in the present case in particular the axial shrinkage of the hollow fibers, does not lead to damage of the hollow fibers.

This arises from the fact that the hollow fiber bundle is attached only to the support ring and not to the housing, thus allowing a limited degree of movement of the hollow fiber bundle together with the support ring within the housing. In this way, the shrinkage arising from heat or steam sterilization can be compensated, since the hollow fiber bundle, or alternatively, the individual hollow fibers, is thereby capable of following the shrinkage and yielding in response to it. Leakages and damage to the hollow fibers can thus be effectively avoided.

When, in accordance with a preferred embodiment, the support ring further comprises axially projecting lugs, which lugs are preferably arranged on the side of the support ring facing the center of the housing, whereby the lugs are preferably formed to be flexible, the support ring is especially axially movable.

The term flexible is here to be understood as meaning compliant in the sense that the lugs are formed so as to be compressible or foldable. When for example a corresponding compressive force is applied to the support ring in an axial direction, the lugs will be compressed or folded against a correspondingly formed shoulder on the housing and the support ring pushed axially in the direction of the compressive force until it again rests, with other parts or regions, against the shoulder on the housing.

This provides the added significant advantage that axial shrinkages of the hollow fiber bundle of the kind occurring, for example, during heat-sterilization of in particular synthetic hollow fibers, can be compensated. To this end, during fabrication of the filter, the entire hollow fiber bundle is axially compressed such that the embedded ends of the hollow fiber bundle are shifted by a few millimeters towards each other. This has the effect that the individual hollow fibers in the hollow fiber bundle and within the housing are relatively slack or loose, similar to a loose bundle of strings. The hollow fibers, embedded at either end within the potting compound, can thus undergo some axial contraction and thereby compensate for axial shrinkages arising for example from heat sterilization, without becoming damaged or being torn apart. For example, through an appropriate configuration of the flexible lugs, and by compressing each end of the hollow fiber bundle by just two millimeters in a direction towards the center of the housing, a compensation capability for the hollow fibers of up to four millimeters can be provided.

The axially protruding, flexible lugs may of course be differently dimensioned, and they may for example be longer, so that a greater compression of the hollow fiber bundle is possible by application of a compressive force on the support ring. The axially protruding lugs are thereby bent or compressed, thus allowing a movement of the support ring and with it of the embedded end of the hollow fiber bundle in an axial direction, i.e. relative to the filter housing.

Whilst it may seem redundant, it is nevertheless pointed out at this stage, that a compression of the hollow fiber bundle is only possible when its ends are embedded within the respective support ring. Accordingly, the potting compound must lie only within the support ring, in order to avoid a connection between the support ring and the housing. The potting compound may be comprised of any suitable material such as, for example, polyurethane (PUR).

In addition, the axially protruding, flexible lugs may be accommodated on the housing in an appropriate manner instead of on the support ring. The axial movability of the support ring is thereby also enabled, allowing axial shrinkage of the hollow fibers and thereby also of the hollow fiber bundle to be compensated.

For the compensation of axial shrinkage, the hollow fiber bundle may be axially compressed during the fabrication process, as described above. This allows, so to speak, a compensation of axial shrinkage in advance, before its occurrence. Alternatively, the hollow fiber bundle is not compressed in advance, and instead the compensation of axial shrinkage of the hollow fibers may take place simultaneously with its occurrence. Accordingly, the flexibly formed lugs allow the contracting hollow fibers within the housing to thereby draw the axially movable support rings in a direction towards the center of the housing.

In order to seal the filter, or the housing, the end-cap is sealingly connected to the housing. The embodiment to be chosen for this feature depends upon the constructive arrangement of the filter. The sealing connection of the parts with one another may be achieved by the use of adhesive means, by welding, or by means of a seal between the respective parts. For example, elastic sealing rings or the like may be used for this.

The sealing connection forming the seal between the first and the second fluid containing areas may also be achieved by use of adhesive, by welding or by means of appropriate seals such as, for example, O-rings.

It should be noted at this point, that the previously mentioned axial movability as well as a certain radial movability of the support ring, i.e. its movability relative to the housing, is only possible when the support ring is not fixed to either the end-cap or to the housing or both, whether by adhesive or by welding means. Only then does a certain relative movability of the support ring and thereby of the hollow fiber bundle remain within the finished filter.

Finally, according to a preferred embodiment, the filter is advantageously provided with an inlet and an outlet for a first fluid, as well as at least one outlet for a second fluid. Preferably, the inlet for the first fluid is arranged on one end-cap, while the outlet for the first fluid is provided on the other end-cap, so that the first fluid may be readily directed into the housing, through the inside of the hollow fiber bundle and out of the housing on the other side. The outlet for the second fluid can be accommodated on an end-cap or on the housing, depending upon the intended use of the filer.

According to another preferred embodiment, the filter is provided with an inlet for the second fluid, which is preferably accommodated on an end-cap or on the housing.

DESCRIPTION OF THE DRAWINGS

The invention will now be described in more detail in the context of a preferred embodiment with reference to the attached drawings. These show.

DESCRIPTION OF PREFERRED EMBODIMENTS

Figure 1:
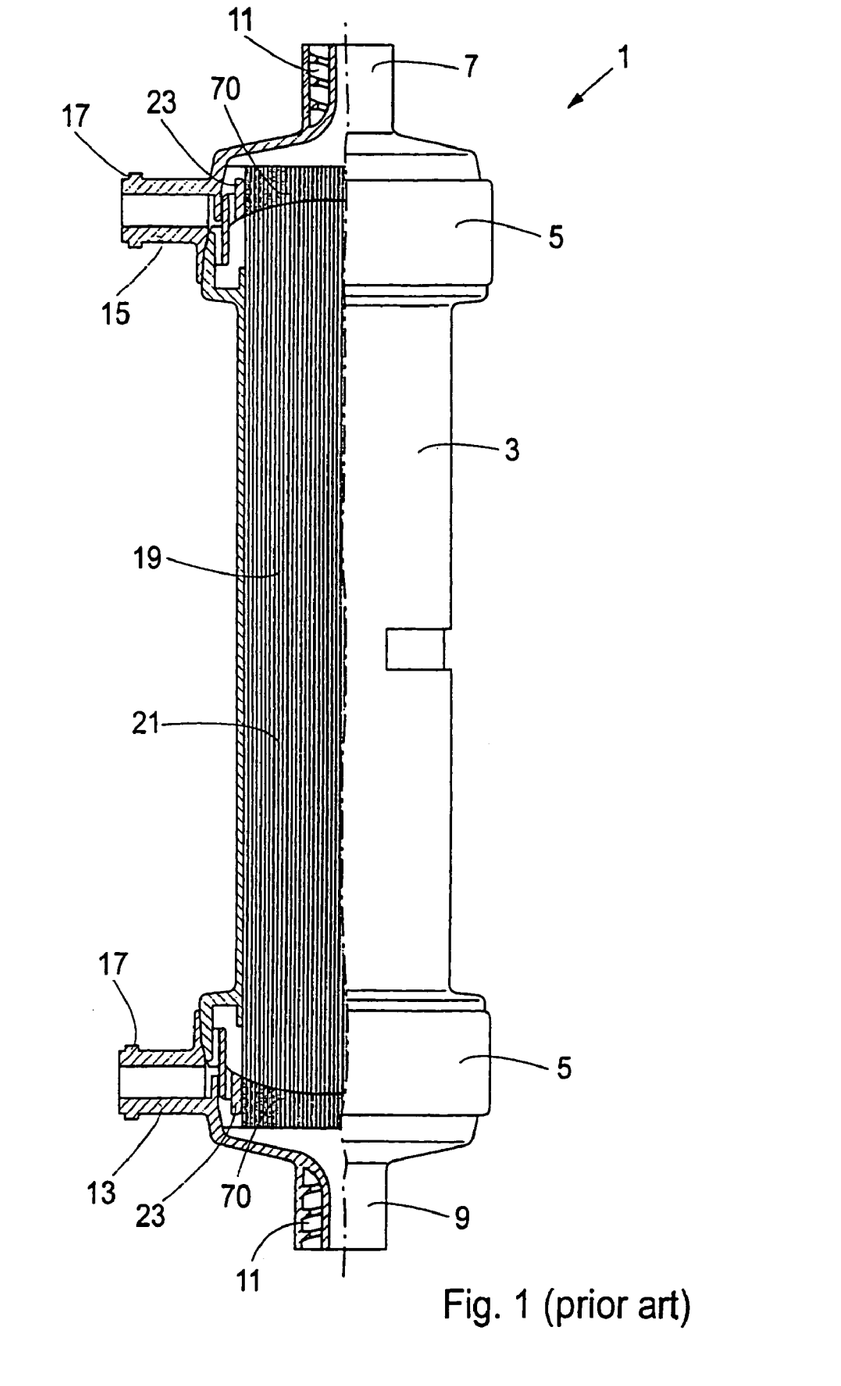
FIG. 1—a partial-section of a filter according to the state of the art.

FIG. 1 depicts a partial longitudinal view of a filter I according to the state of the art. The filter 1 has a tubular filter housing 3, which has an end-cap 5 attached at each end. Each end-cap 5 has an inlet 7 or outlet 9 for a first fluid, each of which is provided with an internal screw-thread 11. The end-caps 5 are furthermore provided with an inlet 13 or outlet 15 for a second fluid, each of which is provided with an external screw-thread 17. Within the tubular housing 3, a hollow fiber bundle 19 is arranged, which extends between the ends of the housing 3. The ends of the hollow fiber bundle 19 are surrounded by a support ring 23 and are embedded into the ends of the housing 3 by means of a potting compound 70.

The filter 1 functions as follows: connection tubes for a first fluid are connected to the inlet 7 and outlet 9 by means of the internal screw-thread 11. Similarly, connection tubes for a second fluid are connected to the inlet 13 and to the outlet 15 by means of the external screw-thread 17 provided. A first fluid is then directed through the inlet 7 towards the end of the hollow fiber bundle 19. The ends of the hollow fibers 21, which make up the hollow fiber bundle 19, are open and are comprised within the ends of the hollow fiber bundle 19, so that the first fluid can be directed inside the hollow fibers 21 and through to the other side of the filter 1. There, the first fluid emerges from the end of the hollow fiber bundle 19 and is conducted away through the outlet 9.

A second fluid is conducted into the housing 3 via the inlet 13, where it then flows along the outside of the hollow fibers 21 of the hollow fiber bundle 19 to the other end of the housing 3, from where it is conducted away through the outlet 15.

The first fluid and the second fluid are conducted past one another in opposite directions and on different sides of the hollow fiber membrane 21, during which various known convection and diffusion processes take place through the walls of the hollow fibers.

Figure 1A:
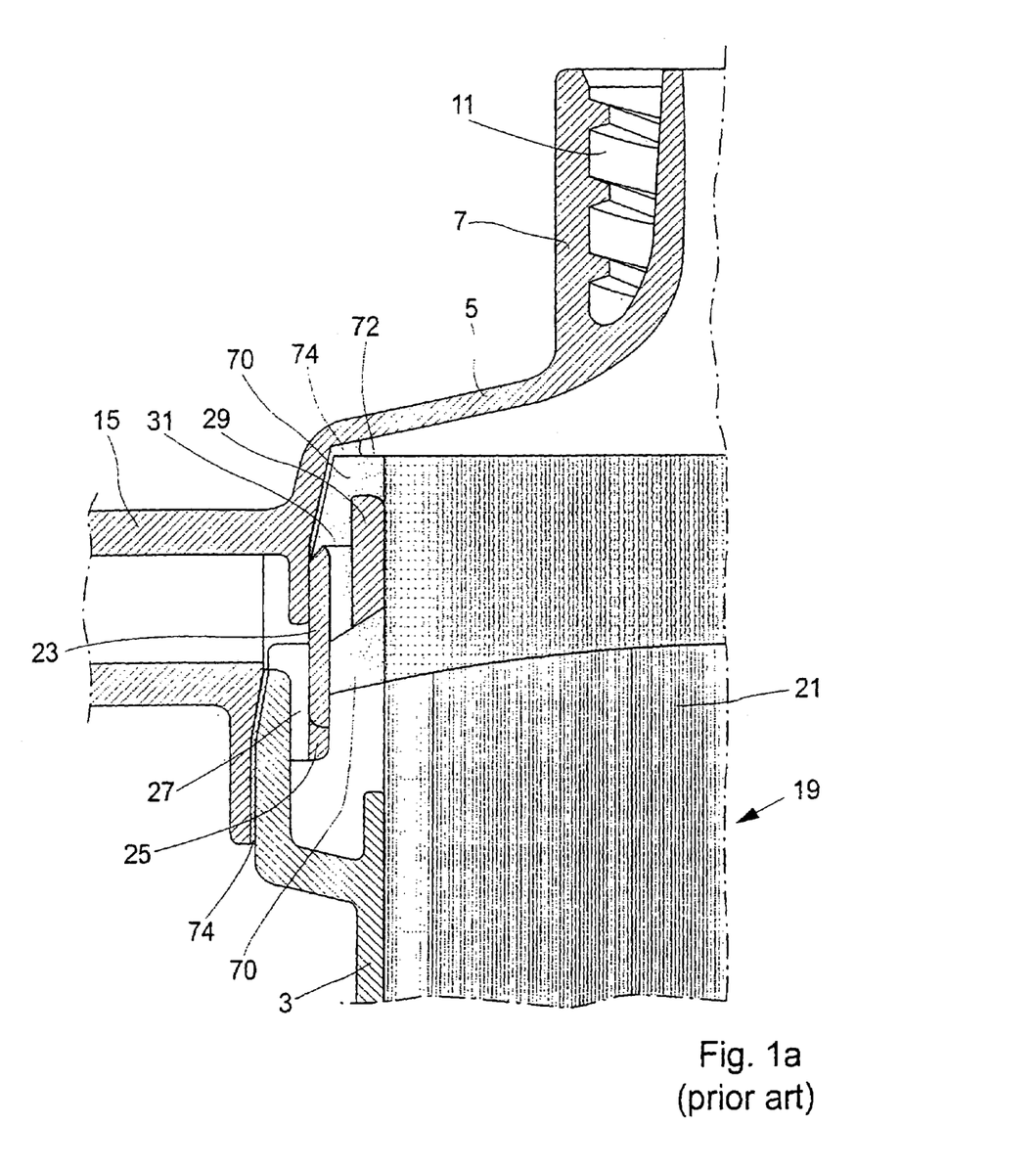
FIG. 1A—an enlarged partial view of FIG. 1, showing a longitudinal section of the end of the hollow fiber bundle with the support ring.

FIG. 1A depicts an enlarged partial view of FIG. 1 showing the end of the hollow fiber bundle 19. The hollow fiber bundle 19 is surrounded at its end region by a support ring 23, which support ring 23 has a first portion 25 and a second portion 29. The first portion 25 is provided with a number of radial flanges 27 which connect the first portion 25 to the housing 3. The flanges 27 are configured such that they support the support ring 23 both axially and radially. The peripheral first portion 25 is additionally provided with further radial flanges 31 by means of which it is connected with the second peripheral portion 29. The second portion 29 surrounds the end portion of the hollow fiber bundle 19. This end-portion of the hollow fiber bundle 19, along with the support ring 23, is potted within the end of the housing 3 by means of a potting compound 70. The second portion 29 of the support ring 23 is thereby completely enclosed within the potting compound 70.

The end-cap 5 is placed on the housing 3 and is sealingly attached to the housing 3 by an adhesive 74. The end-cap 5 is also fixed to the potting compound 70 by the same adhesive 74 and is in radial contact with the outside of the first portion 25 of the support ring 23.

A ring 72 of potting compound 70, is disposed between the periphery of the hollow fiber bundle 19 and the inside of the end-cap 5 and has a broad width. This arrangement prevents penetration of adhesive 74 into the hollow fibers 21, the open ends of which are disposed in the end of the hollow fiber bundle.

Figure 2:
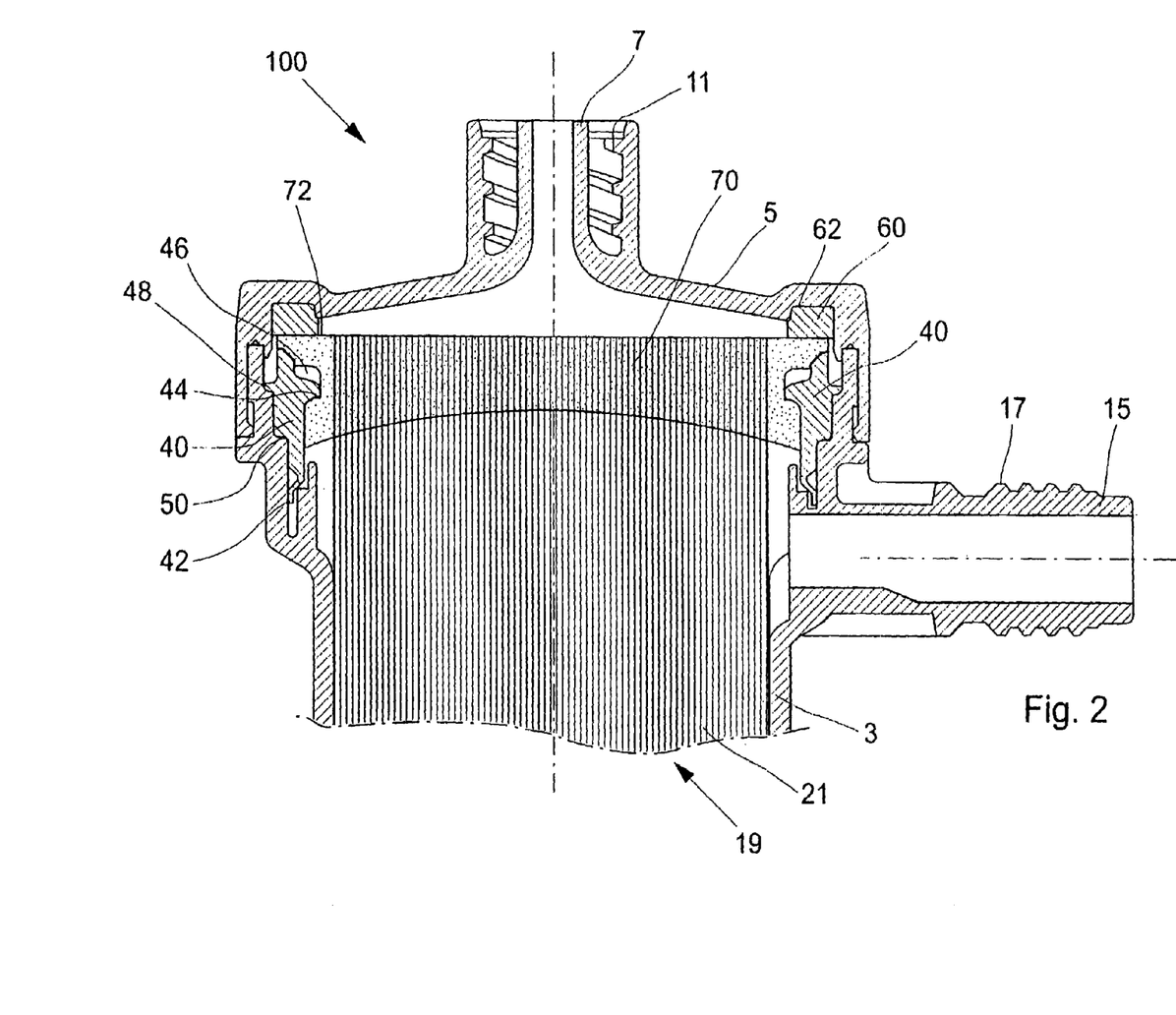
FIG. 2—a longitudinal section through one half of a filter according to the present invention with a compressed hollow fiber bundle.

FIG. 2 shows a longitudinal section of a filter 100 according to the invention, in which for the sake of simplicity only one half of the filter is shown and in which equivalent parts have been given the same reference numeral. The filter 100 has a tubular housing 3 and an end cap 5, one of which is shown, attached to each end of the housing 3. The end-cap 5 has an outlet 7 which comprises an internal screw-thread 11. The housing 3 further comprises an outlet 15 for a second fluid, the said outlet 15 having an external screw-thread 17. A hollow fiber bundle 19 comprised of hollow fibers 21 is arranged within the housing 3, the hollow fiber bundle 19 having been compressed. The end of the hollow fiber bundle 19 is potted into a support ring 40 by means of a potting compound 70.

The support ring 40 is provided at one end with a plurality of lugs 42, which will be described more fully in the following description of the support ring 40, along with the rim 44, the flanges 46 and the steps 48 and 50.

It should be noted at this point, that an alternative arrangement of the inlets and outlets could also be provided, as is known to one skilled in the art. For example, the outlet 15 could equally be arranged on the end-cap 5.

Figure 3:
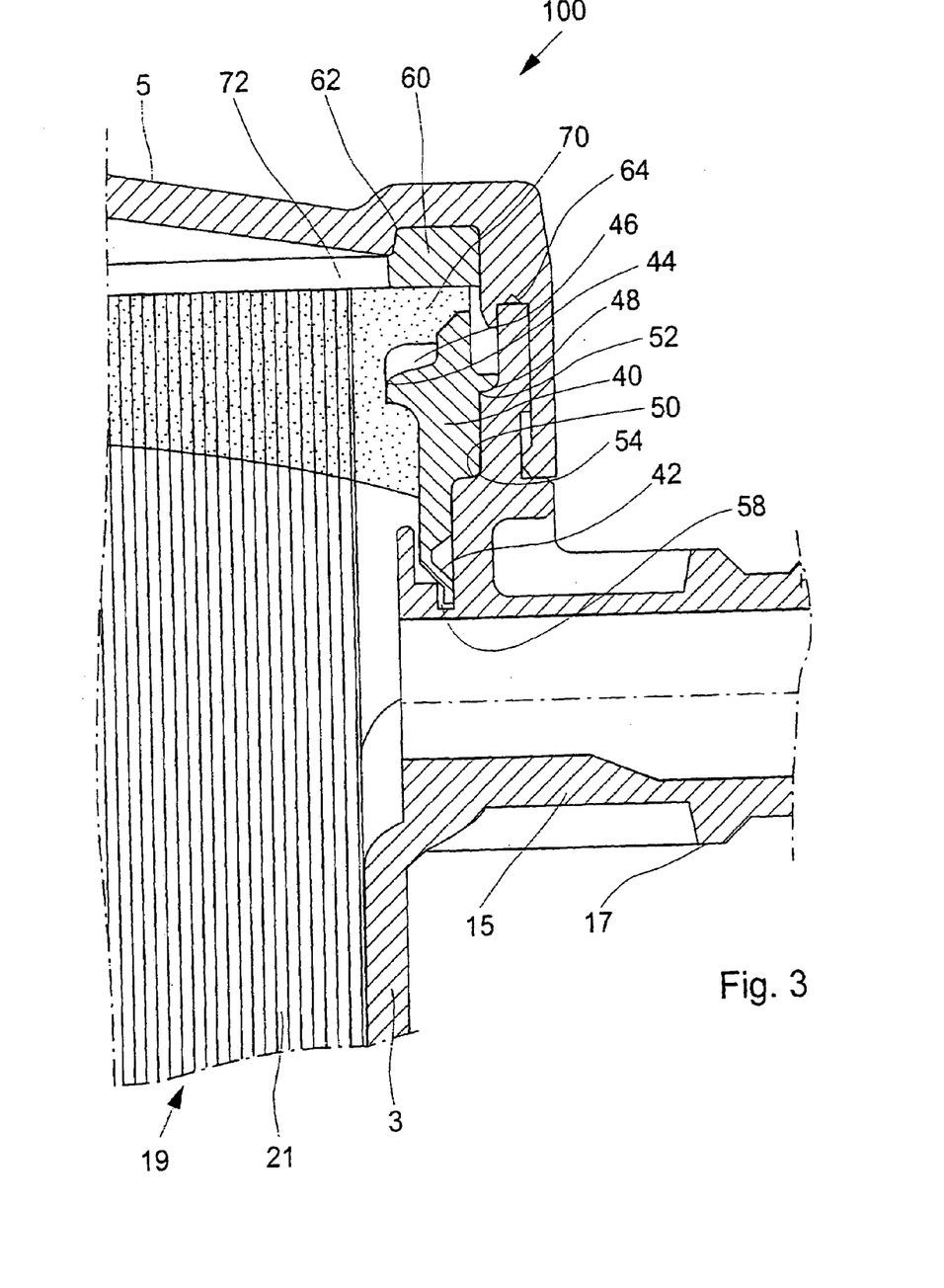
FIG. 3—an enlarged partial view of FIG. 2, showing the end of the hollow fiber bundle with the support ring.

FIG. 3 shows an enlarged partial view of FIG. 2, showing the end of the hollow fiber bundle 19 potted into the support ring 40. Also here, equivalent parts are given the same reference numeral.

The support ring 40 is provided, at its end facing the end-cap 5, with an inwardly protruding shoulder 44 with flanges 46. The rim 44 and the flanges 46 attached to it create a fitted connection between the support ring 40 and the potting compound 70, in addition to the adhesive connection between the potting compound 70 and the support ring 40. On its outside, the support ring 40 is provided with two steps 48 and 50, which rest upon correspondingly shaped shoulders 52 and 54 on the housing 3. At its lower end, the support ring has a plurality of flexible lugs 42, one of which is illustrated here. The flexible lug 42 is bent and extends into a corresponding recess 58 in the housing 3.

According to the present embodiment, the end-cap 5 is sealingly connected to the housing 3 at a connection portion 64, as shown here by means of welding, for example using ultrasound. A further possibility, from among several others, involves bonding, using suitable adhesive means known to the skilled person.

The end-cap 5 is provided at its periphery with a recess 62, in which a sealing ring 60 is accommodated. This sealing ring 60 delimits the peripheral region of free space formed between the end-cap 5 and the end of the hollow fiber bundle 19, such that only a narrow ring 72 of the potting compound is present in the aforementioned free space. This improves the flow characteristics of the first fluid which is conducted into the hollow space via the inlet 7 of the end-cap 5, and from there passes into the open ended hollow fibers 21, through which it flows to the opposite end of the filter housing 3. The improved flow characteristics create i.e. a flushing of the first fluid through the peripheral region of the hollow space, i.e. the space above the ring 72 of potting compound, so that a build-up of deposits is prevented. When the first fluid is comprised of blood for example, as is foreseen in the embodiments mentioned in detail above, this prevents the blood from being stationary and thereby from clotting. This thereby greatly reduces the risk of blood clots and thus renders the above-mentioned examples of use or treatments considerably safer for the patient.

In addition, the sealing ring 60 seals the region of the filter through which the first fluid flows from the region through which the second fluid flows.

The filter 100 shown in FIG. 3 is a finished filter, i.e. ready for use. The hollow fiber bundle 19 of the filter has been axially compressed, as can be readily seen from the bent flexible lug 42, which has been forced into the recess 58 of the housing 3. The function of the flexible lug 42, as well as that of the compression operation of the hollow fiber bundle 19, will now be described in detail with reference to FIGS. 4–8.

Figure 4:
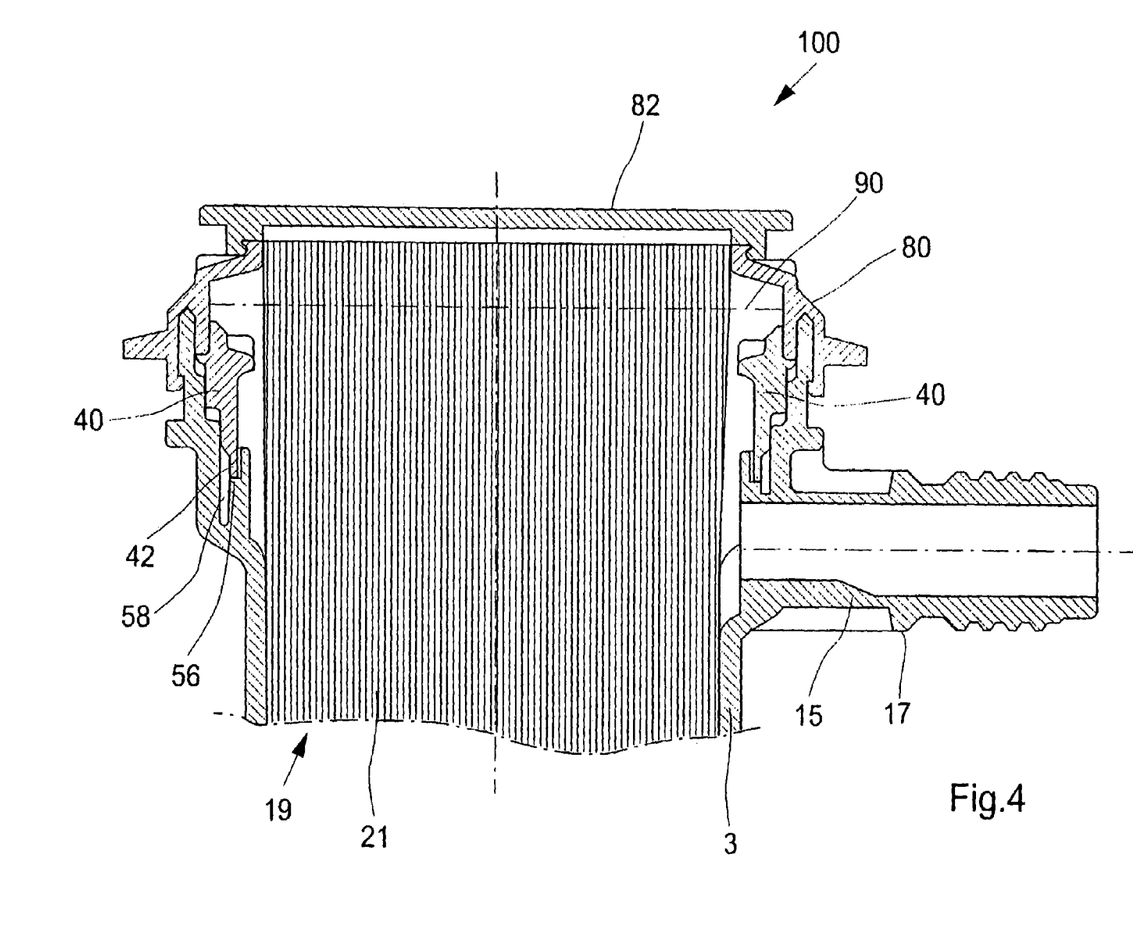
FIG. 4—a longitudinal section though one half of a filter according to the invention, prior to the application of the potting compound and prior to compression.

FIG. 4 shows a longitudinal section of an end of the filter 100 prior to the application of the potting compound and prior to the axial compression of the filter bundle 19. Here also, equivalent parts are given the same reference numeral.

The hollow fiber bundle 19, placed within the filter housing 3, is held in place vis-à-vis a mould ring 80. The mould ring 80 is attached to the housing 3 at one end, and at its other end, bears a molding cover 82. The support ring 40 rests with its flexible lugs 42 located upon a shoulder 56 on the housing. The dotted line 90 indicates the line along which the hollow fiber bundle 19 is to be cut following the potting operation.

Figure 5:
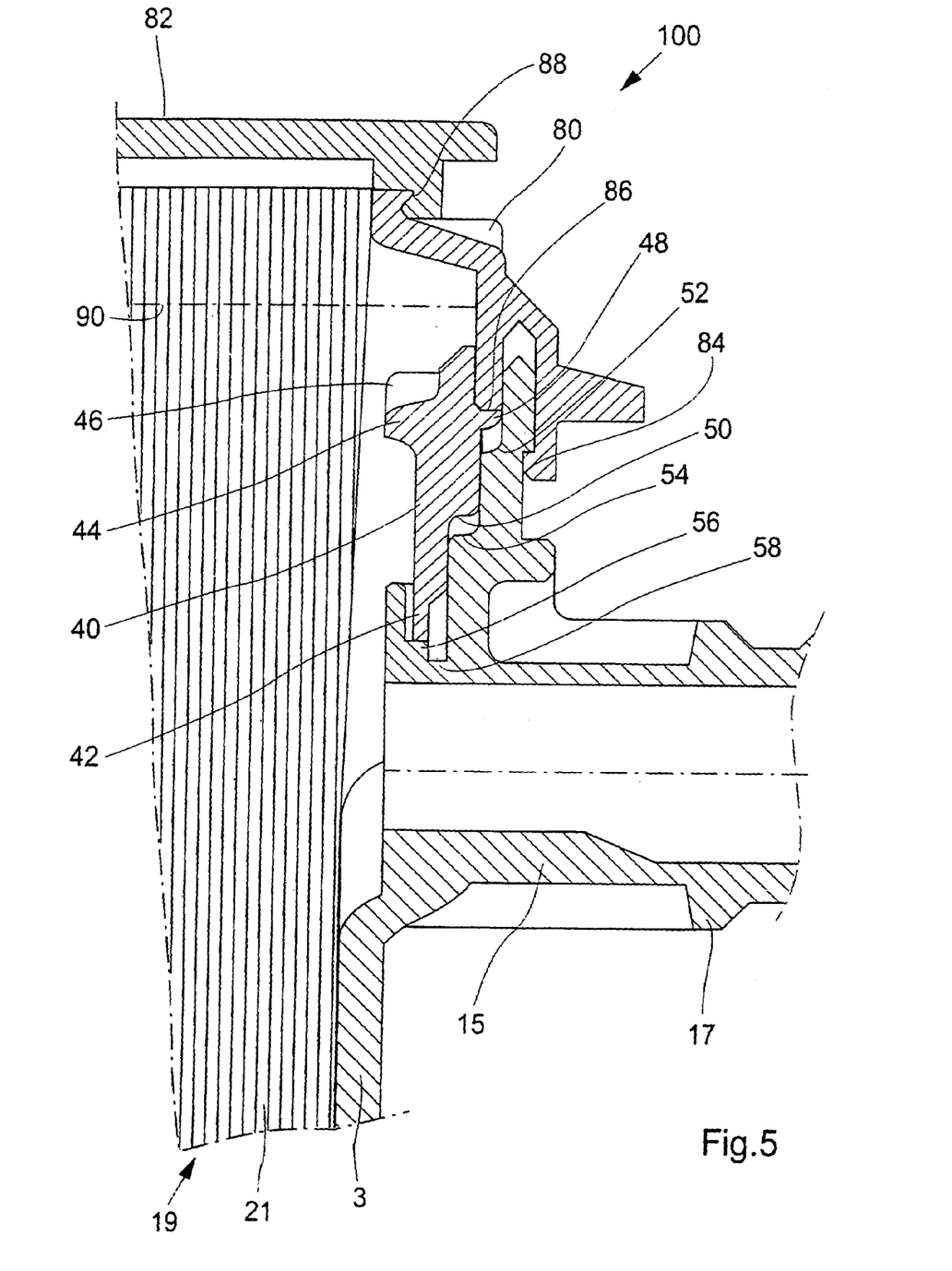
FIG. 5—an enlarged partial view of FIG. 4.

For the sake of a better understanding, the description will now be continued with reference to FIG. 5, in which an enlarged partial view of FIG. 4 is depicted.

As can be clearly seen from FIG. 5, the mould ring 80 has fastening means 84 at its end nearest the housing 3, which means 84 engage with a correspondingly shaped projection on the housing 3 thereby securing the mould ring 80 to the housing 3, together with the projection 86, and the support ring 40, as will be explained in detail. Furthermore, as can readily be seen, the mould ring 80 has fastening means 88 at its other end which cooperate with a correspondingly shaped portion of the molding cover 82 to fix the molding cover onto the mould ring.

As is illustrated here, the flexible lug 42 of the support ring 40 is not deformed prior to the axial compression and potting operations, and is seated on a shoulder 56 on the housing. The free space between the step 48 of the support ring 40 and the shoulder 52 of the housing 3 is easily recognizable, as is the free space between the step 50 of the support ring 40 and the shoulder 54 of the housing 3.

The above-mentioned protrusion 86 of the mould ring 80 rests upon the step 48 of the support ring 40. The support ring 40, or its position within the housing 3, is firstly thereby fixed. Secondly, the mould ring 80, or its position in the housing 3, is consequently also fixed. The step 48 of the support ring 40 limits the movement of the protrusion 86 and thereby also of the mould ring 80 in the direction towards the housing 3, i.e. it limits the downward movement (FIG. 5), while the fastening means 84 of the mould ring 80 limit movement of the mould ring 80 in a direction away from the housing 3, i.e. an upward movement (FIG. 5). At the same time, the protrusion 86 of the mould ring 80 limits the movement of the support ring 40 away from the housing 3, while the flexible lug 42 which abuts the shoulder 56 on the housing 3, limits the movement of the support ring 40 towards the interior of the housing 3.

In the condition illustrated in FIG. 5, the filter 100 is ready for the introduction of the potting compound for potting the end of the hollow fiber bundle 19, or the hollow fibers 21 arranged therein. For this purpose, the potting compound is usually introduced through the outlet 15 of the housing 3, and is then pushed into the mould ring 80 and molding cover 82 by centrifuge means, i.e. by rotation of the filter 100, such that the hollow fibers 21 are cast together in order to seal the hollow fiber bundle 19 at its ends.

Figure 6:
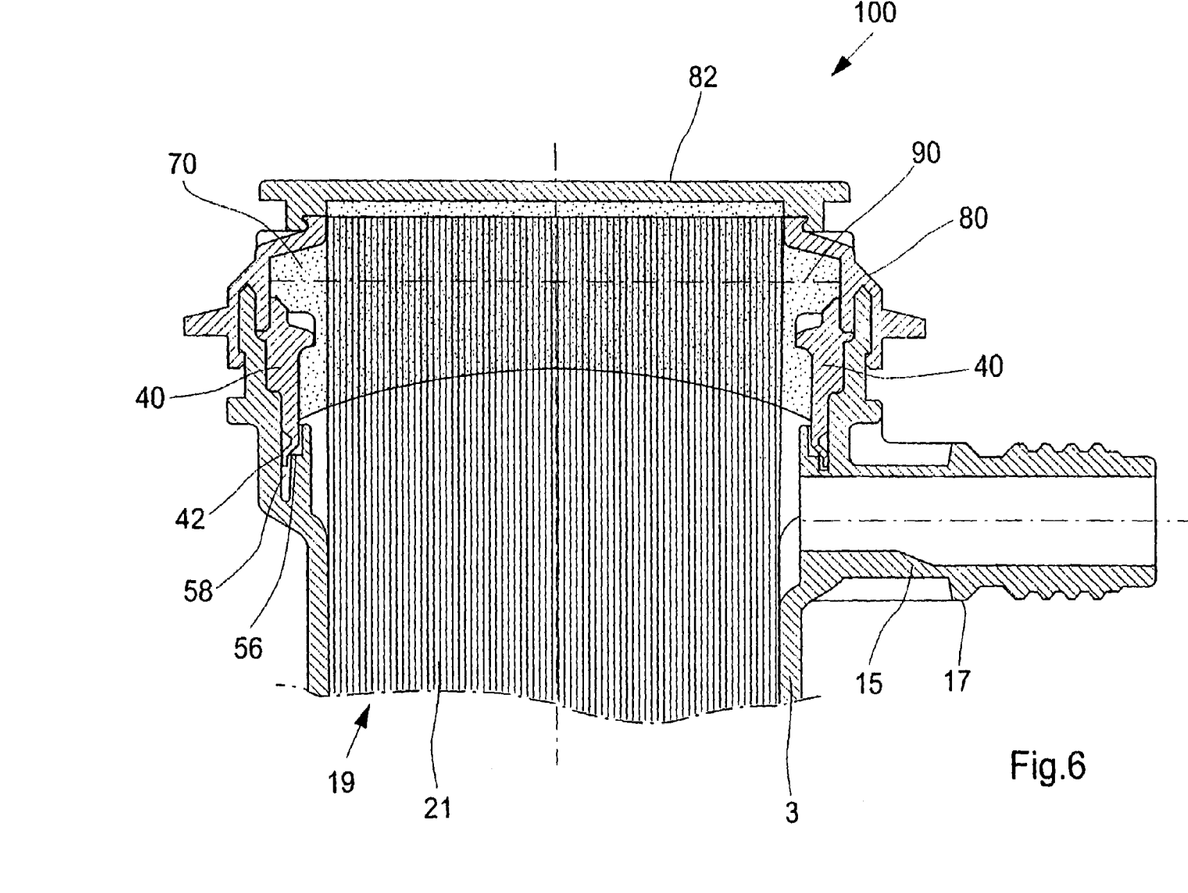
FIG. 6—a longitudinal section through one half of a filter according to the invention after the application of the potting compound and after the axial compression.

FIG. 6 depicts a longitudinal section view of an end of the filter 100 after the potting of the ends of the hollow fibers 21 with the potting compound 70 as well as after the axial compression of the entire hollow fiber bundle 19. Here again, equivalent parts are given the same reference numeral.

From FIG. 6, it can easily be seen that the potting compound 70 casts the ends of the hollow fibers 21 together, so that a solid, cohesive end of the hollow fiber bundle 19 is created. The potting compound 70 is distributed in the manner shown by virtue of the centrifugal force, while the support ring 40 together with the mould ring 80 and molding cover 82, define a mould for the potting compound. The potting compound 70 is thereby prevented from coming into contact with, and adhering to, the housing 3. The relative movability between the support ring 40 and the housing 3, necessary for the axial compression of the hollow fiber bundle 19, is thereby maintained, as is shown in FIG. 6.

The compression operation causes the flexible lugs 42 to bend and to be pushed outwards, such that they are slid into the recess 58 in the housing 3, thereby having enabled an axial movement of the support ring 40 along with the end of the hollow fiber bundle 19, which end is potted into the support ring.

Figure 7:
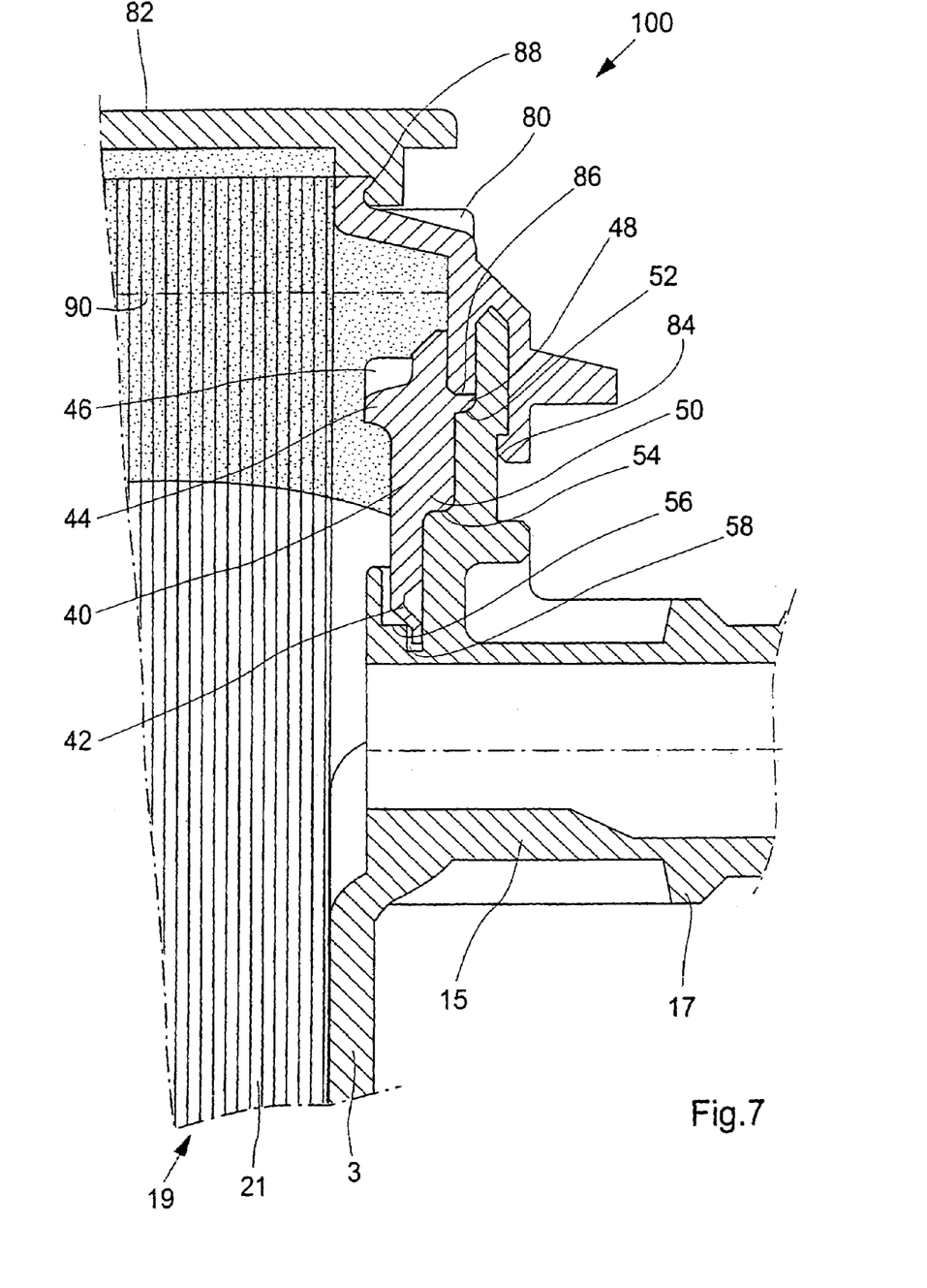
FIG. 7—an enlarged partial view of FIG. 4.

This can be more clearly seen from FIG. 7, which depicts an enlarged partial view of FIG. 6. Here also, equivalent parts are given the same reference numeral.

The end of the hollow fiber bundle 19 is pushed towards the center of the housing 3 by virtue of the compression operation. As a result of this, the flexible lugs, which abut the shoulder 56 of the housing 3, are bent and forced into the recess 58 of the housing 3. The hollow fiber bundle 19 is shifted until such a time as the steps 48 and 50 abut the corresponding shoulders 52 and 54 of the housing 3, as shown in FIG. 7. The configuration of the shoulders 52 and 54 on the housing 3 thus determines the maximum axial compressibility of the hollow fiber bundle 19. It is therefore necessary to arrange the shoulders 52 and 54 in a configuration corresponding to the desired axial compression of the hollow fiber bundle 19, while taking account of the material from which the hollow fibers 21 are comprised.

The axial compression of the hollow fiber bundle 19 is carried out by means of a compression force applied to the molding cover 82 and/or to the mould ring 80. The hollow fiber bundle 19 is thereby longitudinally compressed, the flexible lugs 42 are bent and forced into the recess 58, and the end of the hollow fiber bundle 19 is partially pushed into the housing 3. Since this is carried out simultaneously on both ends of the housing 3, the hollow fibers 21 are thus relaxed by a few millimeters and thereby lie somewhat loose within the hollow fiber bundle 19 and the housing 3. This enables them to readily compensate shrinkage of a few millimeters without breaking or otherwise being damaged.

As explained above at length, the relative movability between the support ring 40 or the hollow fiber bundle 19 and the housing 3, is enabled by virtue of the potting compound 70 being contained substantially only within the support ring 40. This relative movability of the support ring 40 enables the compression of the hollow fiber bundle 19, which later allows a compensation of longitudinal shrinkage of the hollow fibers 21. These shrinkages of the hollow fibers 21 are a consequence of the final heat-sterilization of the finished filter 100, and occur mainly in synthetic fibers.

The invention claimed is:

1. A filter comprising:
   a tubular housing;
   membranes made from hollow fibers arranged in a bundle within said tubular housing;
   an end cap at each end of said tubular housing, said hollow fiber bundle arranged between the ends of said tubular housing;
   a potting material casting the ends of said hollow fiber bundle with the ends of said hollow fibers being open;
   a support ring surrounding the potting material at each of the ends of the hollow fiber bundle; and
   wherein said support rings are axially movable with respect to said housing.

2. The filter according to claim 1, wherein said support rings comprise axially extending lugs.

3. The filter according to claim 2, wherein said axially extending lugs are arranged on the side of said support rings facing the center of said tubular housing.

4. The filter according to claim 2, wherein said axially extended lugs are formed of flexible material such that said support rings are axially movable to compensate for axial shrinkages of said hollow fiber bundle.

5. The filter according to claim 1, wherein said tubular housing comprises axially protruding lugs upon which said support rings are seated.

6. The filter according to claim 1, wherein said end-caps are sealingly joined to said tubular housing.

7. The filter according to claim 6, wherein said end-caps are bonded or welded to and tubular housing.

8. The filter according to claim 6, wherein said end-caps are sealingly joined to said tubular housing by means of a seal.

9. The filter according to claim 1 further comprising an inlet and an outlet for a first fluid, and at least one outlet for a second fluid.

10. The filter according to claim 9, wherein said inlet for said first fluid is arranged on one of said end-caps, and said outlet for said first fluid is arranged on the other of said end-caps.

11. The filter according to claim 10, wherein said outlet for said second fluid is arranged on one of said end-caps.

12. The filter according to claim 10, wherein said outlet for said second fluid is arranged on said tubular housing.

13. The filter according to claim 9, further comprising an inlet for said second fluid.

14. The filter according to claim 13, wherein said inlet for said second fluid is arranged on one of said end-caps.

15. The filter according to claim 13, wherein said inlet for said second fluid is arranged on said tubular housing.

* * * * *

UNITED STATES PATENT AND TRADEMARK OFFICE
CERTIFICATE OF CORRECTION

PATENT NO. : 7,014,765 B2 Page 1 of 1
APPLICATION NO. : 10/169456
DATED : March 21, 2006
INVENTOR(S) : Jürgen Dannenmaier It is certified that error appears in the above-identified patent and that said Letters Patent is hereby corrected as shown below:

Column 1,
Line 40, "can for example be" should read -- can, for example, be --.
Line 66, "filter" should read -- filters --.

Column 2,
Line 9, "can for example be" should read -- can, for example, be --.

Column 3,
Line 1, "When for example a" should read -- When, for example, a --.
Line 21, "arising for example" should read -- arising, for example, --.
Line 29, "may of course be" should read -- may, of course, be --.
Line 30, "may for example be" should read -- may, for example, be --.

Column 5,
Line 50, "compound 70, is" should read -- compound 70 is --.

Column 6,
Line 41, "open ended" should read -- open-ended --.
Line 47, "blood for" should read -- blood, for --.

Column 8,
Line 56, "end cap" should read -- end-cap --.

Column 9,
Line 14, "and" should read -- said --.

Signed and Sealed this

Eleventh Day of July, 2006

JON W. DUDAS
*Director of the United States Patent and Trademark Office*